(No Model.) 2 Sheets—Sheet 2.
J. A. HEALY.
VALVE MECHANISM.
No. 580,279. Patented Apr. 6, 1897.
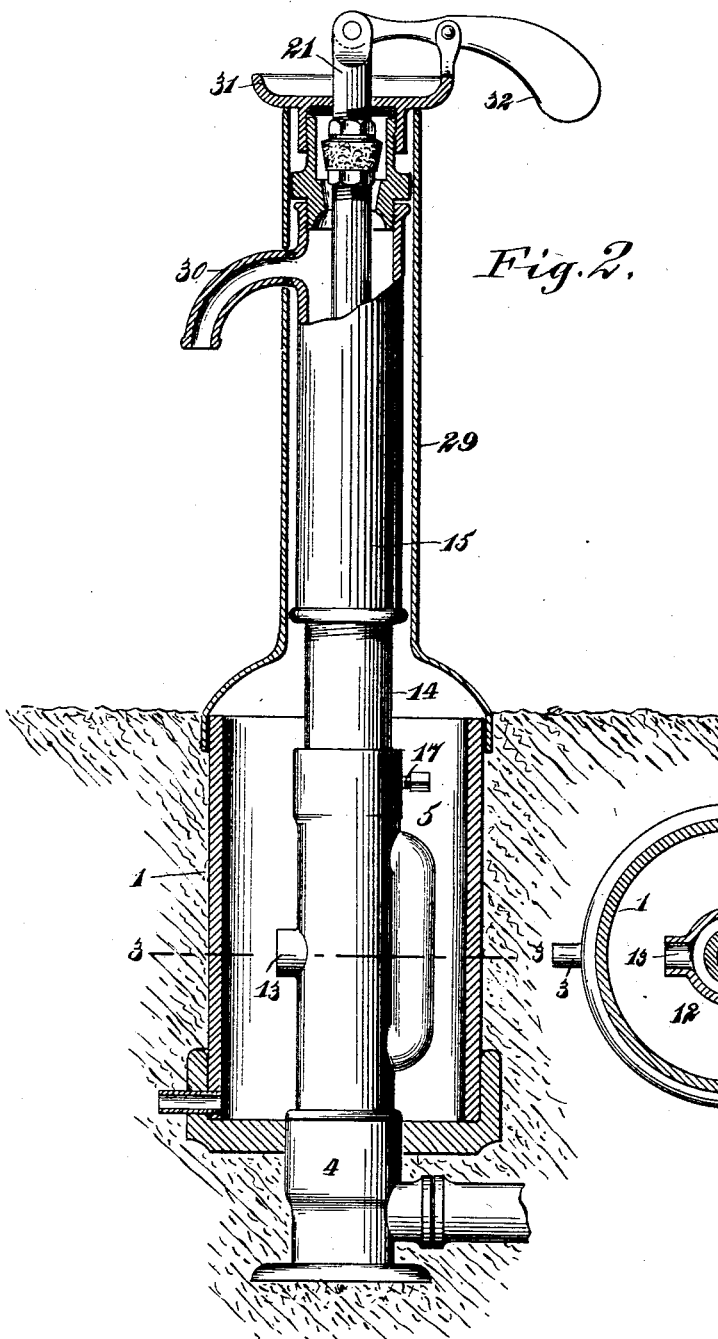
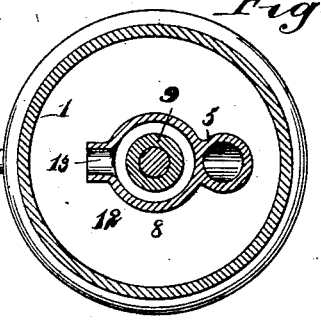
WITNESSES:
L. N. Legendre
C. R. Ferguson
INVENTOR
J. A. Healy.
BY
ATTORNEYS.

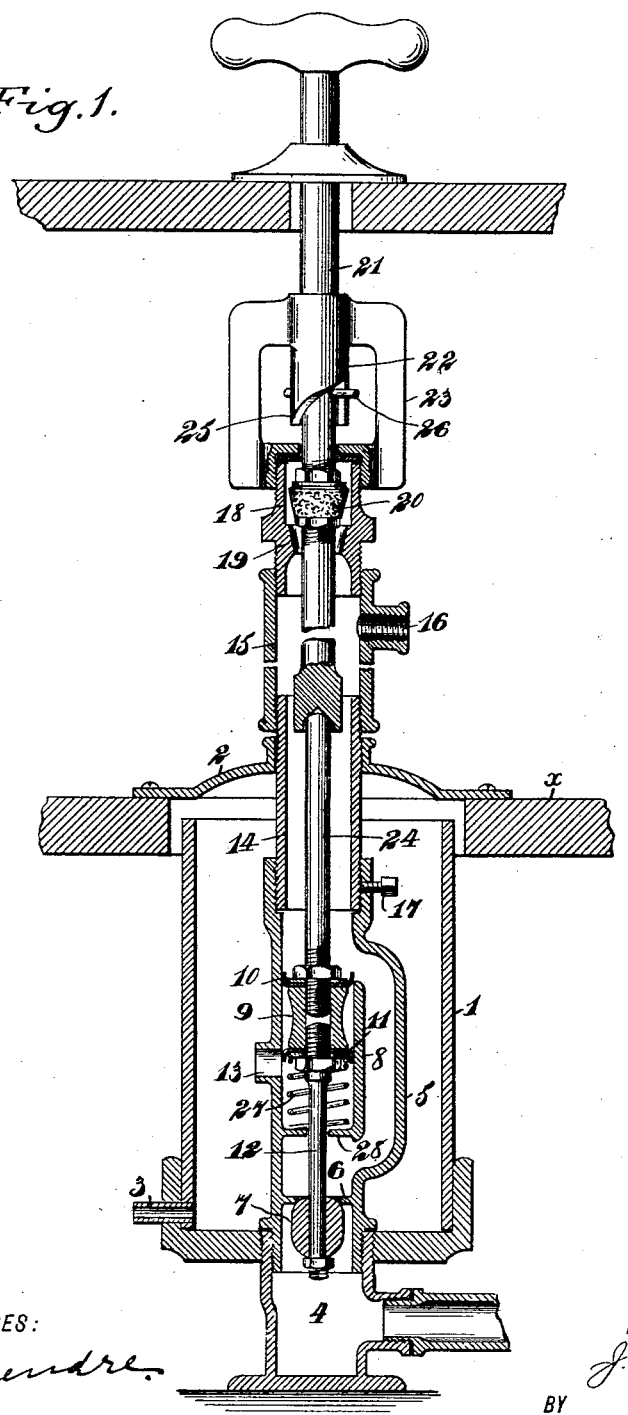

UNITED STATES PATENT OFFICE.

JAMES A. HEALY, OF NASHVILLE, TENNESSEE.

VALVE MECHANISM.

SPECIFICATION forming part of Letters Patent No. 580,279, dated April 6, 1897.

Application filed March 31, 1896. Serial No. 585,619. (No model.)

*To all whom it may concern:*

Be it known that I, JAMES A. HEALY, of Nashville, in the county of Davidson and State of Tennessee, have invented certain new and useful Improvements in Valve Mechanisms, of which the following is a full, clear, and exact description.

This invention relates to valves for flushing devices, hydrants, and similar constructions; and the object is to provide a valve mechanism so constructed that it may be easily reached for repairing without removing the entire structure from the ground and in which leakage of water is reduced to a minimum and which is so constructed as to be self-closing.

I will describe a valve mechanism embodying my invention and then point out the novel features in the appended claims.

Reference is to be had to the accompanying drawings, forming a part of this specification, in which similar characters of reference indicate corresponding parts in all the figures.

Figure 1 is a vertical section of a valve mechanism embodying my invention. Fig. 2 is a partial elevation and partial section showing a modification, and Fig. 3 is a section on the line 3 3 of Fig. 2.

Referring first to the example of my improvement shown in Fig. 1, 1 designates a discharge-tank designed to be placed underneath a floor or in the ground. This tank is open at its top and is here shown as having its top extended into an opening in a floor $x$, and a cover 2 has its edge secured to the floor over the open upper end of the tank. This cover 2 is curved upward toward its center, through which a pipe passes, so that the part 2 serves as a brace for the valve mechanism as well as a cover to prevent entrance of dirt to the tank 1. The lower portion of the tank 1 is provided with an outlet-pipe 3, which may lead to a sewer, and an inlet-pipe 4 leads through the bottom of the tank.

Within the tank 1 is a water receiving and discharging pipe 5, having a connection at its lower end with the inlet-pipe 4 and provided in its lower portion with a valve-seat 6 for an inlet-controlling valve 7, which is of the ball type and preferably of yielding material, such, for instance, as rubber.

A tubular valve-casing 8 within the pipe 5 has a waste-water-controlling valve 9 working in it. This valve 9 comprises a metal body portion and cup-shaped flexible valve-plates 10 11 on its ends. The valves 7 and 9 are connected together by means of a rod 12, and the valve-casing 8 has a discharge-outlet 13 discharging into the tank 1.

Connected to the upper end of the water-receiving pipe is a pipe-section 14, which extends through the cover 2 and communicates with a pipe 15, having a water-outlet nipple 16. The several pipes have screw-thread engagement, and as a means for more firmly connecting the pipes 5 and 14 I may employ a set-screw 17.

On the upper end of the pipe 15 is a valve-pipe 18, having a downwardly and inwardly tapered valve-seat 19, adapted to receive a correspondingly-tapered plug-valve 20, mounted on a push-rod 21. This plug-valve 20 is of yielding material, such, for instance, as cork, and its office is to serve instead of a stuffing-box to prevent water from discharging through the upper end of the pipe where the push-rod passes through. The push-rod 21 passes through a sleeve 22, forming a part of a yoke 23, having a screw-thread engagement with the pipe 18, and the inner end of the rod 21 has a loose cup-bearing engagement with the end of a valve-stem 24, extended upward from the valve 9. The lower end of the sleeve 22 is provided with spirally-disposed cam-surfaces 25, with which a pin 26, extended through the push-rod, is adapted to engage.

In operation by turning the push-rod 21 to the right by means of the handle on its upper end the pin 26, engaging with the cam-surfaces 25, will cause the rod to move downward, causing the valve 9 to close the outlet 13, and also move the valve 7 from its seat, allowing the water under pressure to enter the pipe 5 and flow out through the nipple 6 to perform its flushing operation. Upon releasing the push-rod the water-pressure on the valve 7 will move the parts upward, closing the water-inlet and opening the outlet 13, through which waste water will discharge down to the level of said outlet 13. The pressure of the water to close the valve 7 may be assisted by means of a spring 27, engaging at one end with the valve 9 and at the other end with a spider 28 in the lower end of the casing 8.

It will be seen that by the construction described there will be no rotary movement of the valve 9. Therefore it is subject to very little wear by friction.

In the example of my improvement shown in Fig. 2 the main features are the same as those pointed out in the first example. In this second example, however, the device is shown in the form of a hydrant, the exposed portion of the pipe being covered with a jacket 29, which may be ornamented as desired, and a spout-outlet 30 leads from the pipe 15. In this example the push-rod 21 extends upward through a dished cap-piece 31 and is pivotally connected to a hand-lever 32, fulcrumed to a bracket extended from the cap-piece. The lower portion of the jacket 29 is flared outward and downward to form a cover for the tank 1.

It will be seen that when it is desired to remove the valve mechanism for repairing it is only necessary to unscrew the pipe 5 from the inlet-pipe 4, and then the mechanism may be lifted out.

Having thus fully described my invention, I claim as new and desire to secure by Letters Patent—

1. The combination of a discharge-tank having a waste-outlet, a water receiving and discharging pipe in the tank and having a valve-seat in its lower end, a valve therefor, a valve-casing in the pipe and having a waste-outlet, a valve in the casing for controlling said outlet, a connection between said valve and the first-named valve, a stem extended upward from said waste-outlet valve, a push-rod having a cup-shaped lower end into which said stem extends, a valve-pipe surrounding the rod and a plug-valve on the rod for engagement in a valve-seat in the valve-pipe, substantially as specified.

2. The combination of a discharge-tank having a waste-outlet, a water receiving and discharge pipe in the tank having a valve-seat in its lower end, a valve therefor, a valve-casing in the pipe having a waste-outlet, a valve in said casing for controlling said outlet, a connection between said valve and the first-named valve, a spring between the waste-outlet-controlling valve and a spider at the lower end of its casing, a stem extended upward from said waste-outlet-controlling valve, a push-rod having a cup-shaped lower end into which the said stem extends, and means for causing said rod to move longitudinally when rotary movement is imparted to it, substantially as specified.

JAMES A. HEALY.

Witnesses:
JAMES J. BARNARD,
JOHN F. HEALY.